Dec. 23, 1969    TEIZO MATSUZAKI    3,485,425
METHOD OF AND APPARATUS FOR AUTOMATICALLY
CONVEYING A GLASS SHEET AND TAKING
OFF THE CRACKED-OFF GLASS PLATES
Filed Dec. 28, 1966    3 Sheets-Sheet 1
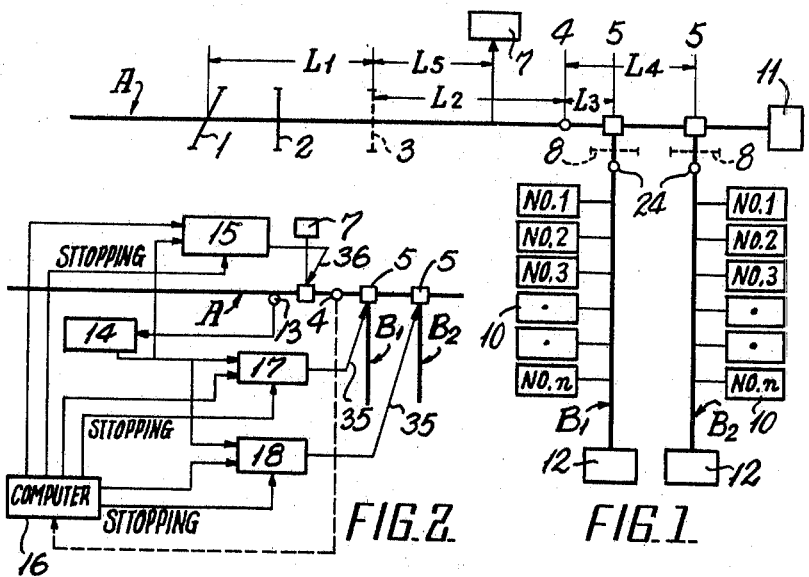
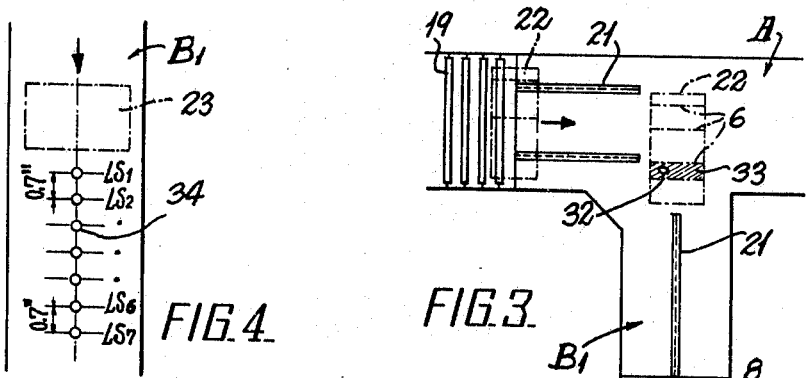
FIG. 5
| C | LS7 | LS6 | LS5 | LS4 | LS3 | LS2 | LS1 |
|---|-----|-----|-----|-----|-----|-----|-----|
| 3560 | 0 | 0 | 0 | 0 | 0 | 1 | 1 |
| 3590 | 1 | 1 | 1 | 1 | 1 | 1 | 1 |
| 3620 | 1 | 1 | 1 | 1 | 1 | 1 | 1 |
| 3650 | 1 | 1 | 1 | 1 | 1 | 1 | 1 |
| ⋮ | ⋮ | ⋮ | ⋮ | ⋮ | ⋮ | ⋮ | ⋮ |
| 3770 | 1 | 1 | 1 | 1 | 1 | 1 | 1 |
| 3800 | 1 | 1 | 1 | 0 | 0 | 0 | 0 |
INVENTOR.
TEIZO MATSUZAKI
BY
Bailey, Stephens + Huettig
ATTORNEYS Dec. 23, 1969  TEIZO MATSUZAKI  3,485,425
METHOD OF AND APPARATUS FOR AUTOMATICALLY
CONVEYING A GLASS SHEET AND TAKING
OFF THE CRACKED-OFF GLASS PLATES
Filed Dec. 28, 1966  3 Sheets-Sheet 2

INVENTOR.
TEIZO MATSUZAKI
BY
Bailey, Stephens + Huettig
ATTORNEYS

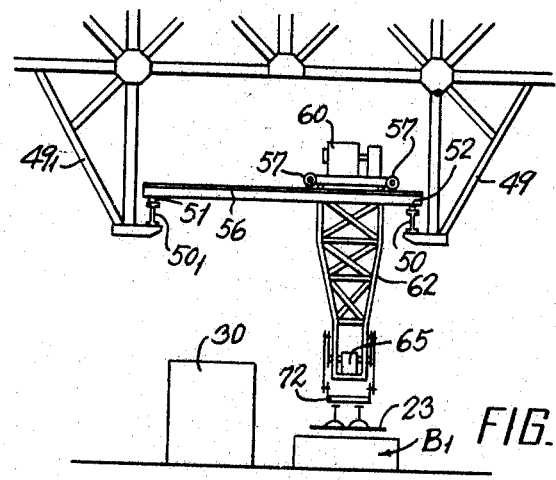
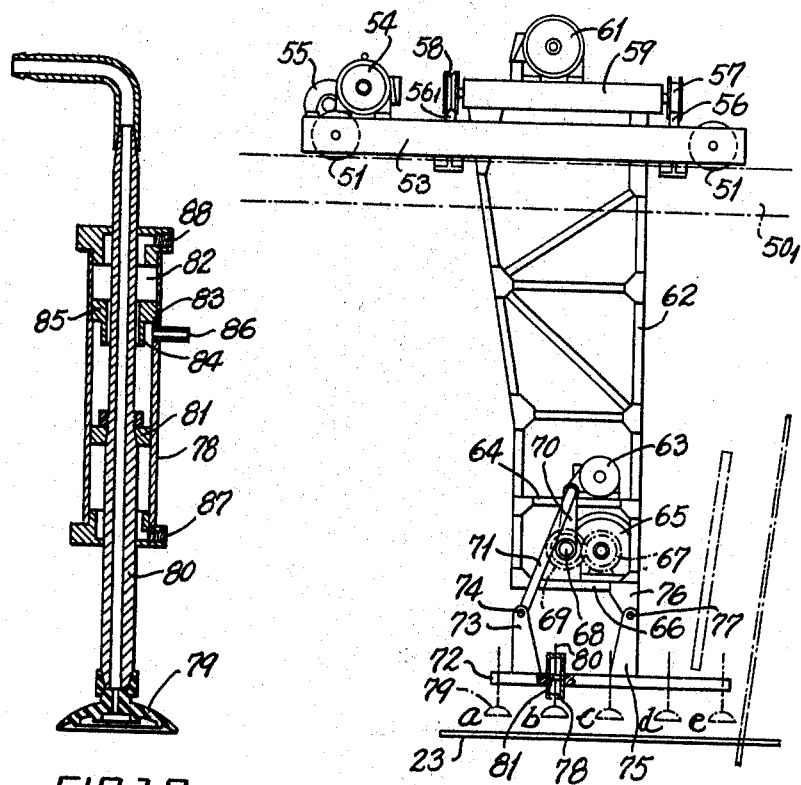

United States Patent Office 3,485,425
Patented Dec. 23, 1969

3,485,425
METHOD OF AND APPARATUS FOR AUTO-
MATICALLY CONVEYING A GLASS SHEET
AND TAKING OFF THE CRACKED-OFF
GLASS PLATES
Teizo Matsuzaki, Yokohama, Japan, assignor to Asahi
Glass Co., Ltd., Tokyo, Japan, a corporation of Japan
Filed Dec. 28, 1966, Ser. No. 605,255
Int. Cl. B26f 3/00; B07c 5/04, 1/10
U.S. Cl. 225—2                                    14 Claims

ABSTRACT OF THE DISCLOSURE

A method and apparatus for delivering the cracked-off glass plates in combinations of various sizes from a first conveyor to second conveyors, and taking off the glass plates from the second conveyors automatically and separately according to their sizes, by means of computer control.

---

The present invention relates to a method of and apparatus for automatically conveying a glass sheet and taking off the cracked-off glass plates and more particularly, to a method of and apparatus for automatically conveying a continuous ribbon-like glass sheet or a large glass sheet by a first conveyor and carrying forward by a second conveyor or conveyors in branching away from said first conveyor glass plates obtained by cracking-off the said glass sheet in combination of various sizes while being carried forward on the second conveyor or conveyors, and subsequently taking off the thus cracked-off glass plates by means of loading machines from the said second conveyor or conveyors automatically and separately according to their sizes.

The glass sheet formed into a ribbon shape continuously from molten glass is annealed and cooled to full extent, thereafter being cut or broken away along the scored lines and then carried forward by a conveyor. In such cutting or cracking-off of a continuous ribbon-like glass sheet or large glass sheet obtained from such ribbon-like glass sheet by cracking-off, it has hitherto been cut into same size continuously at least in a predetermined period of time; the conveyor merely carried these cracked-off glass plates from a cutting section to a take-off section and the glass plates delivered to the take-off section were taken off from the conveyor normally by manual means.

In recent years, however, in order to detect the bubbles, striae, cords and the like scattered disorderly in the glass sheet or the defects such as external flaws produced on the surface of the glass sheet and to effect the most reasonable cutting avoiding such defects and possibly minimizing the waste part containing such defects, there has been proposed a method of cutting glass sheet in combination of several different sizes in consideration of the position of their defects. According to such method, the glass sheet cut or cracked-off in a predetermined size in the cutting section is carried forward indiscriminately by a conveyor to the next procedure, for example, to the take-off section so that the glass sheet being carried on the conveyor and the glass sheet delivered to the take-off section by said conveyor are mixed in size contrary to the case where one kind or more limited kinds of glass sheets of same size is carried forward regularly in the predetermined order as in conventional manners. In addition, glass sheets mixed in size are so irregular that the size of forthcoming glass sheets can not be simply predicted.

Accordingly, automatic take-off operation of such glass sheet from a travelling conveyor separately by size without delay while fully ensuring the safety of glass requires an enormous labor, if performed manually one sheet after another as heretofore, and such automatic conveyance and taking-off of glass sheet necessitates an extremely precise and high controlling technique.

Furthermore, in the conveyance and take-off operation of such glass sheet, the advancing speed of glass sheet cut in a predetermined size tends to become increased particularly in recent years in order to speed up the forming speed itself of glass sheet for enhancing the production or to accelerate the speed in the course of conveyance for promoting the workability of the subsequent treatment or processing of glass sheet after cut in a predetermined size.

In the case of taking into consideration the characteristics of glass sheet which is heavy and easily breakable, it is difficult to take off safely and sepeedily from the conveyor the glass sheet which is carried forward on a conveyor at such high speed. Particularly, in the case where the size of the glass sheet being carried forward is not definite and various sizes are mixed for convenience of the cutting, the operation of taking-off the glass sheet by selection from the conveyor separately by size is more difficult, the higher the advancing speed of glass sheet is.

A principal object of the present invention is to provide a method of and apparatus for carrying forward a continuous ribbon-like glass sheet or a large glass sheet transversely scored into a predetermined size by a first conveyor and taking off the glass plates cracked-off or cut into small sizes from a second conveyor automatically and separately by size.

Another object of the present invention is to provide a controlling method of and controlling apparatus for conveying the glass plates obtained by cutting or cracking-off the glass sheet altogether in combination of various sizes and for taking off these glass plates cracked-off in small size from a second conveyor automatically and separately by size.

A further object of the present invention is to provide a plurality of loading machines for taking off said glass plates being carried forward at relatively high speeds by a second conveyor separately by size in series, to cause said loading machines to move in the moving direction of glass plates at the same speed as the glass plates and to take off rapidly heavy and breakable glass plates from the second conveyor in the course of this synchronous movement.

The present invention is characterized in that the apparatuses participating in such conveyance of the glass sheet and taking off of the glass plates cut into desired sizes are entirely automatically controlled by a computer in association with the cutting operation of glass sheet or independently thereof.

In order that the invention may more readily be understood one preferred embodiment thereof is illustrated, by way of example, with reference to the accompanying drawings, in which FIG. 1 is a schematic view showing the whole operations of the apparatus according to the present invention, wherein a ribbon-like glass sheet formed continuously from molten glass or large sheet glass obtained by cutting said ribbon-like glass sheet into a large size is transversely scored and longitudinally scored in combination of some kinds of sizes and these are subsequently cracked-off along transversely scored line whereby the thus divided glass plates are carried forward by a given conveyor and taken off separately by size in the desired taking-off section.

FIG. 2 is a block diagram showing the control for conveying glass plate cracked-off along the transversely scored line in use of the operation shown in FIG. 1, by means of a computer.

FIG. 3 is a fragmentary enlarged view of a feeding section for transferring the cracked-off glass sheet in branch from the first conveyor A in FIG. 1 to the second conveyor $B_1$.

FIG. 4 is an enlarged view of a section for measuring longitudinal scoring size of a glass sheet taken in the second conveyor $B_1$ at a part adjacent to an inlet of the said second conveyor;

FIG. 5 is a data table read by the longitudinal scoring size measuring device;

FIG. 10 is an elevational view of the loading machine seen from the front side;

FIG. 11 is a side elevational view of a modification of the loading machine seen from opposite side of FIG. 9.

FIG. 12 is a cross sectional view of a raising and lowering mechanism for absorbers c, d and e which are selectively employed from among absorbers provided on the loading machine.

Figure 6:
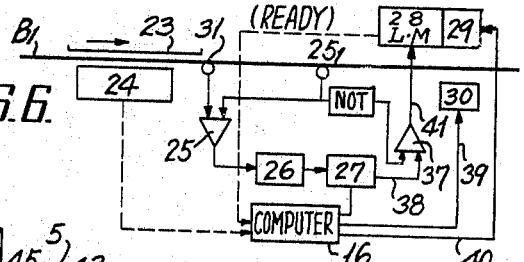
FIG. 6 is a block diagram showing the control of loading machine when this loading machine provided at the second conveyor is controlled by the computer and the glass plates being carried forward on said conveyor is taken off separately by size.

Referring to the drawings in detail, FIG. 1 shows the whole operation for producing transverse and longitudinal scoring lines required for cracking-off or cutting a glass sheet in a predetermined size, then cracking-off the glass sheet along the transversely scored lines, thereafter cracking-off these glass sheets along the longitudinally scored lines and subsequently taking off these cracked-off glass plates separately by size. This operation comprises a first conveyor A for transversely scoring a continued ribbon-like glass sheet or large glass sheet cut from said ribbon-like glass sheet into large size at right angles to and in parallel one another to the advancing direction of glass sheet by means of a transverse scoring apparatus 1; further longitudinally scoring said glass sheet in the area of glass sheet defined by said transversely scored lines by means of a longitudinal scoring apparatus 2; hereafter cracking-off such glass sheet along said transversely scored lines by means of a cracking-off apparatus 3 and two second conveyors $B_1$ and $B_2$ arranged adjacently at desired angles to the first conveyor A in order to take the glass sheet being carried forward on the said first conveyor A after being cracked-off on this conveyor, in branching off from said conveyor A. The glass sheet transversely cracked-off on the first conveyor A is distributed and delivered to either one of the second conveyors $B_1$ and $B_2$ according to their sizes. In this case, the glass sheet cracked-off by the cracking-off apparatus 3 is located at given spaced distances by acceleration of the advancing speed of the conveyor simultaneously at the same time as the cracking-off so as to prevent them from contacting with or impinging on one another in the subsequent course of conveyance and these are conveyed in spaced relation with the front or the rear glass sheet. Further, these second conveyors $B_1$ and $B_2$ are located at the first conveyor A in a desired direction in accordance with the working place, but it is preferred to arrange them in the right angled direction to the first conveyor.

Scoring lines required for scoring a continuous ribbon-like glass sheet or a large sheet glass in a predetermined size are normally obtained by means of a transverse scoring apparatus 1 and a longitudinal scoring apparatus 2 disposed on the first conveyor A. At this time, if there be any defect or defects in the glass sheet, these scoring aparatuses will effect scoring in avoiding such defect or defects and assorting various sizes so as to lessen the waste parts containing defects possibly and to make it most advantageous. Although not shown in the drawings, the longitudinal scoring apparatus 2 will produce longitudinally scored lines, in avoiding defects, if any, and in selecting the most advantageous size, in the area defined by adjacent two scored lines produced successively at predetermined intervals by said transverse scoring apparatus 1, i.e., at same intervals or in assortment of various intervals. For this reason, the glass sheet scored on the first conveyor A includes portions containing defect or defects which are to be discarded and those which are made into final products together and the cracked-off sizes of this glass sheet are ordinarily different. Thus, in order to effect the cutting of the glass sheet requiring such high technique mechanically and automatically, the transverse scoring apparatus 1 and the longitudinal scoring apparatus 2 are respectively controlled by a computer. The glass sheet cracked-off in the first conveyor A is delivered to the second conveyor $B_1$ or $B_2$ as being provided with a longitudinal scoring line 6 (shown in FIG. 3). In these second conveyors $B_1$ and $B_2$ there are, as shown in FIG. 1, disposed respectively $n$ units of loading machines 10 and the above-mentioned transversely cracked-off glass sheet taken in the second conveyor in branch from the first conveyor A is now cracked-off along the longitudinal scoring line 6 and the cracked-off glass plates on the second conveyors are then taken off separately by size by the said loading machine 10. Accordingly, the number of the second conveyors is not limited to two but, more or less increased or decreased, as the case may be. Also the loading machine 10 disposed at each second conveyor $B_1$, or $B_2$ is adequately determined by the kind of size of glass sheet to be taken off and, more precisely, by the knd of size of glass sheet simultaneously scored on the first conveyor A. The drawings show an embodiment in which the second conveyors $B_1$ and $B_2$ are disposed in parallel two spaced rows at the same side of the first conveyor A, but these second conveyors $B_1$ and $B_2$ may be disposed at both sides of the first conveyor A.

The continuous ribbon-like glas sheet or large glass sheet is effected both transverse and longitudinal scorings ordinarily on the first conveyor as described hereinbefore. This process can be applied also in the conveyance and taking off of glass sheet which has been scored only transversely, in which case the operation of the cracking-off apparatus 8 provided in the second conveyor will be stopped and the transversely cracked-off glass sheet distributed and delivered from the first conveyor to the second conveyor is taken in as such separately by size in the same manner.

Further, a particularly large glass sheet or a glass sheet which is hard to take off by the automatic loading machine 10 or disadvantageous to do so is arranged so as to be taken off directly from the first conveyor A to one or more branches 7 disposed at the middle of said first conveyor A.

The most general method of control of conveyance and taking off of a glass as shown in FIG. 1 will be illustrated with reference to FIG. 2 in the following. In order that the computer 16 may always grasp the position of glass sheet divided on the first conveyor A, a pulse generator 13 corresponding to the speed of said first conveyorA is provided in the way of advance of the glass sheet and the pulses generated by said pulse generator are counted by way of a counter 14. Now, the value of the counter at the time when the glass sheet cracked-off on the first conveyor A reaches, for example, the entrance of the second conveyor $B_1$, will be [counter value ($L_0$) obtained when scored by transverse scoring apparatus 1] + [value ($L_1+L_2+L_3$) obtained by translating the distance between transverse scoring apparatus 1 and second conveyor $B_1$ into pulse number], and the value at the time when the above-mentioned glass sheet reaches the branch 7 and the entrance of the second conveyor $B_2$ will similarly be respectively $(L_0+L_1+L_5)$ and $(L_0+L_1+L_2+L_4)$. Just a little before the value of the counter 14 amounts to this value, the above-mentioned values are set from the computer 16 into the coincidence circuit 15 of the branch 7 and also in the coincidence circuits 17 and 18 of each second conveyor. Each coincidence circuit transmits a take-in signal when the set value from the computer 16 coincides with the counter value, and sends instructions. However, in the case where a slip occurs between the glass sheet and the conveyor on which said glass sheet is carried forward, variation in such slip and cracks of the glass sheet on the way of its conveyance becomes the problems in order to feed the glass sheet exactly to the second conveyor. Hence, in the present apparatus, all glass sheets delivered from the first conveyor A to the second conveyor $B_1$ are measured of their sizes in front of said second conveyor $B_1$ and their positions are memorized securely. This transverse scoring size measuring apparatus 4 is provided, for example, at about 120 inches (340.8 cm.) before the second conveyor $B_1$. The said measuring apparatus 4 is substantially the same in function as a longitudinal size measuring apparatus 24, as described later, and the scored sizes of the glass sheet are measured successively when they pass and the results thereof are sent to the computer 16. Thereby, the computer 16 can learn the movement of the glass sheet in passing this place at every moment and upon the basis of this information can judge whether the size and order of sequence of glass sheet being carried on will coincide with the information retained in memory at the time of the aforesaid scoring. Among those informations which are in coincidence, some which require correction are corrected of their basic data replying on the position of the glass sheet at that time, and reversely, those which are not in coincidence in the order of sequence and size are taken in the second conveyor upon the basis of the corrected positions. Further, taking-in the branch 7 is obtained similarly as that of the second conveyor, in which case, for example, a limit switch for confirming the take-in operation (not shown) is provided in the branch 7 to detect taking-in errors. If there should be any error of taking-in in the branch 7, that glass sheet is carried forward in the intact state by the first conveyor, but since said glass sheet is not set in the memory of the computer 16, the order of sequence of the glass sheet carried on to the branching point by the second conveyor goes wrong and a trouble is caused in the taking-on operation to the second conveyor of other glass sheet. Consequently, if any error happened in taking-off in the branch 7, the computer 16 will correct the basic data in memory and discard the glass sheet having such taking-in error in the intact state as a cullet from the end of the first conveyor A, or it will be treated at the collecting part 11 provided at the end of the first conveyor A.

Figure 7:
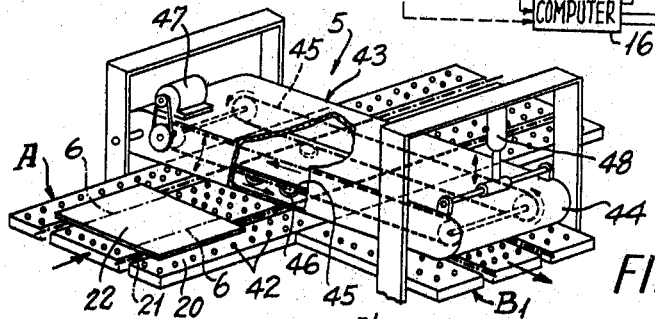
FIG. 7 is a perspective view of a take-in device for transferring the glass sheet from the first conveyor A to the second conveyor $B_1$.

FIG. 7 shows a take-in apparatus 5 for taking a glass sheet 22 carried by the first conveyor A, for example, to the second conveyor in branch. In order to make smooth the branching of the glass sheet 22 from the first conveyor to the second conveyor, the whole support surface of the intersecting part of the first conveyor A with the second conveyor $B_1$ is constituted of an air table 20 as shown in FIG. 3. The glass sheet 22 is carried forward by conveyor rollers 19 of the first conveyor A and transferred while being loaded on this air table 20. The air table 20 is provided with a multiple number of jet holes 42 on the slidable surface thereof and compressed gas is ejected from these holes 42 to retain the glass sheet 22 in floating. The glass sheet 22 is held above the air table 20 by a thin layer of the gas, whereby the contact resistance between the support surface of the air table 20 and the glass sheet can entirely or almost be eliminated.

When the glass sheet 22 is loaded on the air table 20, endless belts 21, which are laid in a recess or cavity formed in the surface of said air table and directed to the same direction as the advancing direction of the glass sheet 22, are brought into contact with the under surface of said glass sheet retained in floating and the glass sheet is transferred to the section where the take-in apparatus has been provided. In this way, the take-up in apparatus 5, which actually takes the glass sheet 22 retained in floating above the air table 20 in branch, is disposed above said air table 20. This take-in apparatus 5 makes use of another conveyor 43 which differs from a conveying means 21 of the air table 20. Said conveyor 43 includes two endless chains 45 on a series of rail frames 44 disposed in adequate spaced relation with the slidable surface of the air table 20, and at some places along the whole length of said chain 45 there are parts 46 resiliently provided so as to come to contact with the upper surface of the glass sheet 22. 47 is a motor means for driving the chain 45, and this chain 45 is urged to run along the advancing direction of the second conveyor to be branched off. Operation of the air cylinder 48 is automatized by control of the computer 16 shown in FIG. 2 so as to synchronize with the advance of the glass sheet 22 by way of the first conveyor A and the end of a frame 44 is caused to lower instantly when the glass sheet 22 reaches the branching point. The chain 45 usually stops and is waiting having its part 46 exactly above the glass sheet 22 which has been carried on to the branching point by a conveying means 21 and starts to move upon receiving the instructions of take-in operation from the computer 16 and makes said glass sheet branch off from the first conveyor A, i.e., when the glass sheet 22 comes to underneath the take-in apparatus 5, and when the size given by the computer 16 in accordance with controlling method in FIG. 2 and the size measured by the counter 14 coincide with each other, a take-in signal 35 is sent to the take-in apparatus 5 from the coincidence circuit 17 and a motor 47 for driving the chain 45 is driven. Just simultaneously as the operation of the motor, the part 46 of the chain 45 comes into contact with the upper surface of the glass sheet 22 and lightly pushes the surface of the glass sheet 22. The part 46 acts as entrainment effect on the glass sheet 22 retained in floating above the air table 20 by rotation of the chain 45 in the direction of the second conveyor $B_1$ and transfers said glass sheet into the second conveyor $B_1$. Said take-in apparatus may similarly be used also for the take-in operation of another conveyor $B_2$ of the second conveyors and the branch 7. In this way, the glass sheet 22 carried on by the first conveyor A is distributed and delivered to either one of the second conveyors $B_1$ and $B_2$ in accordance with the transverse scoring size. These glass plates, for convenience of taking off automatically by the loading machine 10, are required to be carried along the centre of the second conveyor at all times. To this end, this glass sheet is, while being taken in and supported in floating above the air table 20, adjusted their position to the centre of the second conveyors, and then cracked-off along the longitudinal scored line 6 by the cracking-off apparatus 8. The glass sheet 22 which, up to that time, has remained with longitudinal scored line 6 without being cracked-off, is divided into separate sizes by this cracking-off operation. The glass pieces 33 to be discarded which contain defects 32 and wrong parts which correspond to both edges of the ribbon-like glass sheet and are smaller than the predetermined size are thrown away into a hopper (not shown) through a space of the second conveyor $B_1$. The above described cracked-off glass plates 23 are carried toward the loading process along the centre of the second conveyor while being kept at the predetermined spaced distance from the front and rear glass sheets. In this case, a pulse generator 31 and a counter 26 are also provided at the second conveyors in order accurately to grasp the positions of these glass plates 23. This pulse generator 31 can generate a pulse every time as the glass plates 23 advance 0.1 inch (about 0.254 cm.) and the counter 26 counts the pulses. In the rear of the above-mentioned cracking-off apparatus 8, limit switches 34 for measuring the longitudinal scoring size of the cracked-off glass plates 23 together with these pulse generators 31 and counter 26 are provided at intervals of, for example, 0.5 inch (about 1.27 cm.) in the advancing direction of the glass plates 23 as shown in FIG. 4, and the glass plates 23 carried on by the second conveyor are all measured of their sizes while passing on these limit switches 34. That is to say, the computer 16 receives signals from the limit switch 34 and simultaneously reads the value of the counter 26. FIG. 5 is a table showing the data at the time when such reading has been made. In this table, 0 indicates that the glass plate 23 is not on the limit switch 34 and 1 that said glass plate is on it. Accordingly, for example, when the counting value is 3560, the tip end of the glass plate 23 lies between ($Ls_3$) and ($Ls_2$) and when it is 3800, its rear end lies between ($Ls_4$) and ($Ls_5$). The counter 16 counts one pulse each time the glass advances 0.1 inch (0.254 cm.). As the limit switches 34 are provided at intervals of 0.5 inch (about 1.27 cm.), the size of the glass plate 23 will become $$\left(\frac{3800-3560}{10}-1\right)=23 \text{ inches (about 58.5 cm.).}$$

Sizes of all other glass plates 23 may also be measured in the same manner, and the results of its measurement are memorized by the computer 16 for reconfirming the glass sheet 22 which is to be distributed and delivered from the first conveyor A and for preparing data required at the time of controlling the loading machine 10.

Description will now be made on the controlling method of the loading machines 10. The loading machines are provided in $n$ units at each second conveyor and each of which is classified according to size, percentage of demand and other factors and it comprises, for example, those for taking in glass plates of 18 to 48 inches (457.2 to 1219.2 cm.): X units (the three step changing system) and those for taking in glass plate of 23 to 96 inches (584.2 to 2438.4 cm.): Y units (the five step changing system). The three step or the five step changing system used herein indicates the number of absorbing device used for absorbing the glass plate. Loading instructions for each loading machine 10 are given by the computer 16 by the sizes in the advancing direction, that is, longitudinal size of glass plate. The computer 16, since it knows the size of the glass plate 23 now moving on the second conveyor by means of the longitudinal scoring size measuring apparatus 24 or by memory at the time of scoring, gives instructions "to take off a glass plate of some or other inches" to each loading machine 10. On each loading machine 10 is provided a limit switch 25 for measurement of a size, and the sizes indicated by the computer 16 and the actual size of glass plate obtained by this size measurement are now compared, and the loading machine is actuated to take off the glass plate when both of sizes coincide with each other. For this controlling method there are a variety of means. One example, in which a counter is used, will now be described as follows.

FIG. 6 is a block diagram showing one example of this controlling method. Firstly, size of the glass plate 23 moving on the second conveyor is measured by the longitudinal scoring size measuring apparatus 24 and the measured value is input into the computer 16. The computer 16 compares this data with the size memorized at the time of cracking-off on the first conveyor, confirms the measurement of the longitudinal size and gives the loading machine instructions to change the size of glass plate when a cracking-off size will change from old to new. That is to say, when the cracking-off size changes from old to new one, the size of the glass plate that the loading machine 10 has till then been taking off must be changed to a new one and, at the same time, the loading table on which the glass plate is taken by said loading machine must be changed. Hereinafter, this may be referred to as "lot change." In such lot change, since, if assuming a longitudinal scoring measuring position as a basic point, it will take some certain time before the glass plate 23 measured at that position arrives at a predetermined loading machine 10 and it must take off the glass plate of the old size resting on the conveyor between this size measuring position and the loading machine, the lot change must be effected when said glass plate comes to just before the loading machine which is just starting to take off more and precisely speaking, before the glass plate actuates the limit switch $25_1$ for measurement of size in the loading machine. To this end, it is necessary that the computer 16 catches the timing at the time when the glass plate, size of which is measured by means of the longitudinal scoring size measurement apparatus 24, arrives at the loading machine for taking off this glass plate. The computer 16 takes advantage of the results of this measurement and in case such lot change is required, counts the time until the glass plate arrives at the loading machine, and sends instructions to effect a lot change to each loading machine or its controlling apparatus before the glass plate just reaches the loading machine and actuates the limit switch $25_1$ for size measurement provided in each loading machine, and thus indicates the size of the glass plate to be taken newly. The computer 16 effects the control of each loading machine 10 on the basis of measurement of longitudinal size confirmed in this way. That is to say, a limit switch $25_1$ or a photoelectric element as shown in FIG. 3 and FIG. 6 is provided in front of each loading machine 10 provided on the second conveyor. Size of the glass plate advancing on the second conveyor is measured by use of the limit switch $25_1$ and when this is in accord with that of the computer 16, the computer 16 sends operating instructions to the loading machine 10 to take off the glass plates. FIG. 6 is a block diagram at the time of controlling the loading machine. Such controlling system is provided at each loading machine. A pulse generator 31 translates an advancing distance of the glass plate 23 of the second conveyor into pulses. The pulse generator 31 opens a gate 25 when the glass plate 23 makes the limit switch to ON and the counter 26 counts the number of pulses from the pulse generator 31. On the other hand, in the coincidence circuit 27, a size of a glass plate to be taken off is given from the computer 16 as the counter value. The coincidence circuit 27 sends a size coincidence signal 38 when the counter value given by the computer 16 coincides with the value actually counted by the counter 26, and a take off signal 41 is sent to a loading machine 28 (10 in FIG. 1) from the gate 37, only in case that both of the size coincidence signal 38 and NOT signal from the limit switch $25_1$ are sent to the gate 37. Therefore, if the glass plate 23 is shorter than a predetermined size, a size coincidence signal 38 is not transmitted and the counter 26 is cleared and prepared for the next glass plate. Reversely, when the glass plate 23 is too long, the coincidence circuit 27 sends a size coincidence signal 38 when the counter value coincides with the size signal from the computer 16, but, since the glass plate 23 is too long in this case, the glass plate 23 is still staying on the limit switch $25_1$ and, because of limit switch $25_1$ being ON, the take off signal 41 will not be sent from the gate 37. If the size of the glass plate coincides with that specified by the computer 16, the limit switch $25_1$ is off when the size coincidence signal 38 was set, and therefore, take off instructions 41 is sent to operate the loading machine to take off the glass plate and when the limit switch $25_1$ becomes from ON to OFF the counter 26 is cleared. In the present apparatus, such controlling system is provided for each loading machine. By connecting these circuits with the computer 16 respectively and controlling each loading machine 10 individually and automatically by the computer 16, glass plates of the size as specified by the computer 16 can selectively and automatically be taken from among glass plates being carried forward on the second conveyor. If, in this case, any glass plates in the assortment different in size from those being carried forward on the second conveyor should come therein, and when the front end of said glass plate passes on the limit switch $25_1$, the change in size taken off by this loading machine, i.e., the lot change may be effected. This change can be effected regularly in the order from No. 1 loading machine to other. As a means for effecting such operations a counter for timing and a coincidence circuit are employed. The computer, if it will confirm through the transverse scoring size measuring apparatus 4 and the longitudinal scoring size measuring apparatus 24 that the glass plate which is to be changed in assortment has come, instructs the counter for timing to start counting when said glass plate passes through some basic point on the second conveyor, for example, the longitudinal scoring size measuring apparatus 24. The counter for timing sends signal for requesting change of size to the computer 16 each time a counter value corresponding to the distance from the above-mentioned basic point to each loading machine is obtained. Upon receiving, the computer 16 immediately changes the size signal for the loading machine, and more particularly, it changes the size signal to be sent to its coincidence circuit 27 to a new size.

Further, the computer 16 sends a chuck selective signal 40 and a loading table change signal 39 respectively for the absorber 29 of the loading machine 10 and the loading table 30 at the same time as this size signal changes. The computer 16 effects selection of chuck employed in the loading machine in reference to the size of glass plate. Change of the loading table 30 is also effected by an electromagnetic counter provided at each loading machine beside what is effected by the instructions of the computer for changing the size signal. This means that the number of glass plates laminated on one loading table 30 varies with thickness of a glass plate but is limited in number so that in case the number of glass plates to be taken off is too many, the loading table 30 should be replaced by another when the glass plate loaded will reach a predetermined number. In this embodiment, the number of glass plates to be superimposed is counted by the electromagnetic counter and when it reaches a predetermined number the replacement of the loading table is automatically carried out. That is to say, this electromagnetic counter is cleared when the loading table is changed and it counts every time the loading machine lays one plate on the loading table 30, and if a previously set number is reached, a signal is sent to instruct the loading machine to load the glass plate on a different loading table. It is also possible to count the number of sheets by use of this counter.

FIG. 8 to FIG. 11 show such loading machine.

The loading machine is provided respectively in $n$ units along each second conveyor. In the drawings, one of these units has been shown, but other units are similar respectively. In this loading machine, parallel rails 50 and $51_1$ are fixed respectively to suspending frames 49 and $49_1$ on both sides at adequately spaced distance in the same direction as the direction of movement of the said second conveyor and on these rails is mounted a movable table 53 through wheels 51 and 52 on both sides. On one side of this movable table 53 is provided a reversible motor 54 for parallel running and the movable table 53 is moved forward or backward through a reduction gear 55 (FIG. 11). On the movable table 53 are provided rails 56 and $56_1$ for transverse movement in the right-angled direction relative to the parallel rails 50 and $50_1$. On said rails 56 and $56_1$ are mounted a loading stand 59 through wheels 57 and 58. On said loading stand a reversible motor 60 for transverse running is provided which through a reduction gear 61 drives wheels 57 and 58 and moves the loading stand 59 in the right-angled direction relative to the direction of movement of the movable table 53.

Figure 9:
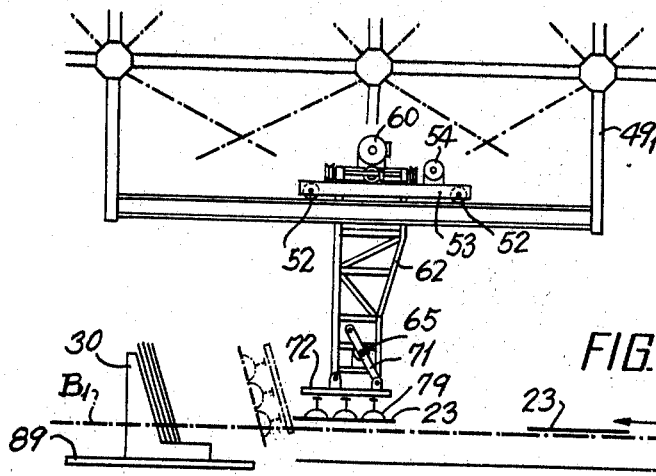
FIG. 9 is a side view of the loading machine shown in FIG. 8 as seen from the transverse direction.

There is a space in the movable table 53 in the middle of the rail 56 and $56_1$ for transverse movement so as not to prevent the movement of the loading frame 62 fixed to the underside of the loading stand 59. At the lower part of the loading frame 62 there are fixed a motor mounting table 64 provided with a reversible motor 63 for inclination and a table 66 for mounting a reduction gear 65 thereon. The reduction gear 65 is provided with a main gear 67 for inclination (refer to FIG. 11) meshing with a follower gear 69 for inclination fixed to a shaft 68 for inclination which pivotally supports said main gear 67 on its both sides. On both sides of said shaft 68 for inclination is fixed rigidly a crank 70, on the tip end of which is pivoted a connecting rod 71 and the other end of which is pivoted to a pivot 74 of a support arm 73 secured to both sides of a chuck frame 72. On the opposite side of the support arm 73 of the chuck frame 72 a support arm 75 is also fixed in a similar way, and its other end is pivotally mounted on a pivotal axis 77 of the support piece 76 fixed on both sides of the table 66. The chuck frame 72 is fixed with a plurality of cylinders 78 at the same positions on both sides. These cylinders 78 respectively are provided with a hollow absorbing shaft 80 having an absorber 79 on the tip end and further provided with a piston 81 inserted into said cylinder 78. By action of said piston 81, the absorbing devices 79 are moved up and down, and the hollow absorbing shaft 80 communicates with a vacuum pump. Thus, the absorbers 79 absorb and retain the glass plate 23 on the conveyor $B_1$ and hold up the glass plate 23 releasably from the conveyor by operation of the piston 81. Further, in the drawings, 30 is a loading stand of the L-shape. Five absorbers $a$, $b$, $c$, $d$, and $e$ are attached to the chuck frame 72 at adequately spaced distance as shown in FIG. 11. Therefore, this loading machine is of the five step changing system. FIG. 9 shows that of the three step change-over system having three absorbers. Although some of these absorbers become unnecessary when absorbing small glass plates, such unused absorbers must be arranged so as to correspond immediately to a large sized glass plate. If all absorbers including unused ones are positioned at the samel level when absorbing small glass plates, the unused absorbers will become obstructive when the loading machine is pushed against the loading table 30 in order to transfer said glass plate to the loading stand 30.

In the loading machine of the present apparatus, a great variety of absorbers are provided so as to conform to various sizes of glass plates in order to overcome the above-described defects and these absorbers are adapted to be used selectively in conformity with the size of glass plate, the unused absorbers being raised and located to position higher than that of the absorbers actually used and moreover, vacuum is interrupted from the unused absorbers by valve operation. Among these five absorbers, $a$, $b$, $c$, $d$, and $e$, $a$ and $b$ are used at all times and the rest $c$, $d$, $e$ are used in combination with said $a$ and $b$ selectively according to the size of glass plate. The absorbers $a$ and $b$ are made of ordinary cylinder 78 fitted with a piston 81 (FIG. 11). On the contrary, the absorbers $c$, $d$, $e$ are, as shown in FIG. 12, constituted of a construction in which an engaging part 83 is provided at the upper part of a cylinder 78 having the same inner diameter as that of the above-mentioned $a$ and $b$ as shown in FIG. 12, the upper portion of said engaging part 83 being of a cylinder 82 of a large diameter, in which is loosely fitted a rear piston 85 having a protruded part 84 at the rear part beside a piston 81 secured to a hollow vacuum shaft 80, said piston 85 being engaged with said engaging part 83 so that it may not come down below said engaging part; a central hole 86 is opened to the cylinder 82 at the lower part of the engaging part 83; and the protruded part 84 of said rear piston 85 is positioned below the central hole 86. Accordingly, if air is fed into the hole 87 at the tip end and the hole 88 at the rear end, the piston 81 cannot push up the rear piston 85 due to the difference in aperture between the piston 81 and the rear piston 85. The stroke of said piston 81 is the same as that of $a$ and $b$ and the absorber 79 is raised to the same level as that of $a$ and $b$. However, in case the glass plate 23 is not held by the absorber 79, if air is exhausted from the hole 88 at the rear end, the rear piston 85 is pushed up together by force of the piston 81 and the absorber 79 is raised higher. FIG. 11 shows the case where all absorbers are used for absorbing the glass plate 23.

Each loading machine employed in the present invention has such construction as described above, and is automatically controlled by the computer according to these methods shown in FIG. 6. The chuck frame 72 is located in parallel with the second conveyor $B_1$ as shown in full lines in FIG. 9, and the size of glass plate to be taken off can be specified by the computer 16 and the number of absorbers to be employed in accordance with its size is given. Thus, when the size given by the computer coincides with the actually measured size, a signal for take off operation is sent to the loading machine. In this case, when the glass plate 23 being carried forward on the second conveyor $B_1$ comes to the predetermined position underneath the above chuck frame 72 which is in waiting, the movable table 53 is moved in the same direction X as the direction of movement of the glass plate 23 at the same velocity by driving of the reversible motor 54 for parallel movement and during its movement absorbers $a$, $b$, $c$ and other selected ones of many absorbers 79 provided at the chuck frame 72 come down simultaneously, and subsequently the absorbers which have come down are actuated by vacuum and hold the glass plate 23 by absorption. By stopping the parallel movement of said movable table 53 at the predetermined position, driving the reversible motor 60 for transverse movement by the limit switch, the timer or the like thereby moving the loading stand 59 on the movable table 53 along the rails 56 and $56_1$ in the transverse direction (Y direction in FIG. 8), the chuck frame 72 which has held the glass plate 23 is moved in the transverse direction, and during which time the reversible motor 63 for inclination is driven to rotate the crank 70 on both sides, whereby the chuck frame 72 is revolved around the pivotal axis 77 through the connecting rod 71 and inclined as shown in dot and dash lines in FIG. 9 and FIG. 11, then the transverse movement is stopped and again the reversible motor 54 for parallel movement is actuated to advance the movable table 53 furthermore, and the glass plate 23 is loaded on the L-type loading stand 30. The loading machine, reverse to the aforementioned operation, returns to its initial position after transferring and loading operation of the glass plate.

Figure 8:
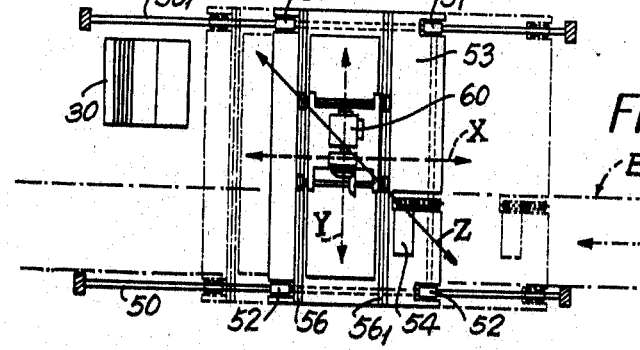
FIG. 8 is a plan view of the loading machine provided at the second conveyor $B_1$ seen from above.

Furthermore, the loading stand 59 may have a construction in which said stand 59 may hold the glass plate 23 by absorption and thereafter drive the reversible motor 60 for transverse movement during the parallel movement of the movable table 53 and move it in the transverse direction, and, accompanying with the movement of said loading stand 59 the chuck frame 72 may move in the Z direction as shown in FIG. 8. Hereinbefore it has been described that the loading stand 59 will make movements in parallel and also in transverse directions, but in case the loading stand 30 is disposed above the second conveyor $B_1$, the transverse movement may not be required, so the loading frame 62 may be fixed directly to the movable table 53 or the loading frame 62 may be provided with a rotating mechanism, which will, after holding the glass plate by absorption, turn in the direction by 90 degrees and move the loading stand 59 in the transverse direction and the glass plate can be mounted on the loading stand 30.

The change of the L-type loading stand 30 is effected at the time when the size of glass plate taken off by the lot change and the number of loaded glass plates reach the predetermined numbers. Such change has been omitted of illustration in the drawings, but it may also be permissible to mount an auxiliary table behind the loading stand in use on the revolving table 89 which is reversely rotated and changed over to the auxiliary table by alteration signal from the computer 16 or the electromagnetic counter, or, though not shown, the reverse stand may be provided in a transverse line and urged to move in the transverse direction by means of said alteration signal.

As for the glass plates being carried forward by the second conveyor, those of same size are, during their transfer movement, taken off selectively in the order of sequence by the aforementioned loading machine 10 provided along said conveyor and until they reach the last loading machine all glass plates will be taken off by any loading machine 10 and will become finished products. Further, the hopper 12 provided at the terminal end of the second conveyor is convenient for discarding wrong glass sheets. According to the present invention, it is further possible to take off heavy and breakable glass plate safely from the conveyor because the loading machine is synchronized with the moving glass plate to move in parallel and during this transfer movement to drop the absorbers on the surface of the glass plate to hold them by absorption. The drawings and the foregoing illustration have presented embodiments only with regard to transfer and loading of glass plates but it may be obvious that the present invention is applicable also to the transfer and loading of any other plate-like bodies.

What I claim is:

1. A method of automatically conveying a glass sheet and taking off the cracked-off glass plates, which comprises disposing at least one second conveyor in branching away from a first conveyor which conveys either one of a ribbon-like glass sheet or a large glass sheet; conveying the glass sheets cracked-off only along the transversely scored line of a glass sheet transversely and longitudinally scored in combinations of various sizes on said first conveyor while the sizes, positions, and order of sequence being retained in memory by computer; delivering thus cracked-off glass plates from the first conveyor to any one of the second conveyors in accordance with the size; and taking off these glass plates being carried forward on the second conveyor automatically and separately by size by means of loading machines provided along said second conveyor and controlled by said computer.

2. A method of automatically conveying a glass sheet and taking off the cracked-off glass plates, which comprises disposing at least one row of second conveyor adjacently at some angles in branch away from a first conveyor which conveys a glass sheet selected from a continuous ribbon-like glass sheet and a large glass sheet which previously has been scored transversely and further scored longitudinally in combination of various sizes and thereafter transversely cracked-off and divided on said first conveyor; conveying the thus obtained glass sheet remained with said longitudinal scoring line from the first conveyor to the second conveyor, while their sizes, positions, and order of sequence being retained in memory by a computer; taking in said transversely cracked-off glass sheet according to the size by means of a take-in apparatus disposed at a branching place of said first conveyor and second conveyor and automatically controlled by the computer; subsequently cracking-off the previously longitudinally scored glass sheet along the longitudinal scoring lines on said second conveyor; and taking off these cracked-off glass plates respectively and selectively by size by automatically controlled loading machines disposed at the second conveyor by means of the computer while these glass plates are being carried forward in a mixture of various sizes by the said conveyor.

3. An apparatus for automatically conveying a glass sheet and taking off the cracked-off glass plates which comprises a first conveyor which conveys a glass sheet cut in a predetermined size; at least one row of second conveyor disposed adjacently at some angles with respect to the first conveyor so as to take in glass sheets conveyed by the first conveyor in branching away from said first conveyor; a take-in apparatus located at a branching place of said two conveyors for transferring the glass sheet of the first conveyor to the second conveyors in branching away from the first conveyor and taking said glass sheet automatically in the second conveyor upon arrival of the glass sheet, a computer for controlling the conveying and taking off of the glass plates, and loading machines disposed at a predetermined spaced distance along the second conveyor and taking off the glass plates of the size specified by the computer selectively and automatically.

4. An apparatus as claimed in claim 3, wherein two parallel, spaced rows of second conveyors are used.

5. An apparatus as claimed in claim 3, wherein at least one branch is provided at the first conveyor whereby a sheet glass not desired to be transferred to the second conveyors is taken in directly from the first conveyor.

6. An apparatus as claimed in claim 3, which comprises absorbers which are employed at all times at the time when a glass plate is absorbed to the loading machine and absorbers which are used selectively at that time, these absorbers being used in combination corresponding to the size of the glass plate to be retained by absorption, wherein selection of the employed absorbers is made automatically by a computer and unused absorbers are caused to be located in the rear part of the absorbers in operation.

7. An apparatus as claimed in claim 3, wherein at least a main part of the first conveyor and a branching part of the first conveyor are constituted by air table on which pressurized fluid is ejected from a flat and smooth surface to support in floating the glass plate cracked-off in a predetermined size.

8. An apparatus as claimed in claim 3, wherein at least two second conveyors are joined at right angles to the first conveyor.

9. An apparatus as claimed in claim 3, wherein the loading machines disposed along the second conveyors are automatically controlled individually by the computer and when size of a glass plate conveyed by said conveyor is in accord with the size specified to the loading machine by the computer, said glass plate is taken off automatically from the conveyor.

10. A method as claimed in claim 2, which comprises providing a counter for measuring size of a glass plate carried on to each loading machine and a coincidence circuit for setting size of a glass plate to be taken off, the loading machine is controlled autmoatically through said counter and coincidence circuit by a computer; a time until some glass plates reach the loading machine for taking off said glass plates is counted; the size of the glass plate which is taken off by the loading machine is set in the coincidence circuit and the coindicence circuit sends a signal to actuate the loading machine by the computer when the specified size and the actual size of glass sheet measured by the counter are in accord; and the loading machine takes off the glass plates being carried on by the conveyor separately by size and the glass plates are transferred on a loading table.

11. A method as claimed in claim 2, wherein when size of glass plates taken off separately by size from the second conveyor by loading machine operating according to instructions of a computer is changed, the computer automatically indicates alteration of size to be taken off to a corresponding loading machine and simultaneously a loading table for transferring the glass plates taken off from the said conveyor by said loading machine is replaced by other table.

12. An apparatus as claimed in claim 9, wherein when the glass sheet to be taken off is carried on underneath the loading machine by the second conveyor, said loading machine is made to run at the same speed and in the same direction as the glass plates and during this synchronous movement the glass plates are retained by absorbers proposed on the loading machine so that the glass plates may be taken up from the said conveyor.

13. A method as claimed in claim 11, wherein a loading machine having a chuck frame provided with many absorbers is located above the second conveyor; said loading machine is moved at the same speed and in the same direction as the glass plates when the glass plates carried on by said conveyor comes to the retaining position of said chuck frame; absorbers are allowed to come down to retain the glass plates by absorption during said synchronous movement; thereafter the loading machine is moved toward the loading table; and chuck frame is revolved in the longitudinal direction and further advanced forward so as to transfer the glass plates to a loading table.

14. An apparatus for automatically conveying a glass sheet and taking off the cracked-off glass plates which comprises a first conveyor for conveying glass sheet transversely cracked off; at least two parallel, spaced rows of second conveyors adjacently disposed at some angles with respect to the first conveyor so as to take in glass sheet carried forward by the first conveyor in branching away from said first conveyor; a computer for controlling the conveying and taking off of the glass plates; a take-in apparatus automatically controlled by the computer through a counter for measuring size of the glass plate and a coincidence circuit and disposed at a branching place of the first conveyor and the second conveyors for taking in the glass sheet on the first conveyor to the second conveyors when the size set in the coincidence circuit from the computer and the actual size measured by a counter are in accord; a longitudinal scoring size measuring apparatus for measuring the cracked-off sizes of glass sheet transferred to the second conveyors and cracked-off along longitudinal scoring line and in putting the measured result to the computer; loading machines disposed along the second conveyors for taking off glass plates carried forward by the second conveyors separately by size according to the instructions of the computer; a counter provided at for each loading machine for controlling said loading machine and for measuring sizes of the glass plates; and a coincidence circuit for actuating the loading machine when the size of glass plates measured by said counter is in accord with the size set from the computer.

References Cited

UNITED STATES PATENTS

| | | | |
|---|---|---|---|
| 2,788,896 | 4/1957 | Coleman | 209—82 |
| 2,876,815 | 3/1959 | Rogers | 209—82 |
| 2,933,185 | 4/1960 | Coleman | 209—82 |
| 2,982,403 | 5/1961 | Harmon | 209—82 |
| 3,190,518 | 6/1965 | Insolio | 225—96.5 |

JAMES M. MEISTER, Primary Examiner

U.S. Cl. X.R.

209—73, 74, 82; 225—96.5